US012647624B2

(12) United States Patent
Mostafavi et al.

(10) Patent No.: US 12,647,624 B2
(45) Date of Patent: Jun. 2, 2026

(54) RENDERING MULTIPLE LIVE-STREAMS ON A USER INTERFACE WITH MINIMAL RESOURCES

(71) Applicant: Google LLC, Mountain View, CA (US)

(72) Inventors: Adam Amir Mostafavi, Foster City, CA (US); Adnan Begovic, Seattle, WA (US); Alexander Crettenand, San Martin, CA (US); Mohammad Aleagha, Redwood City, CA (US); Heidi Muth, Oakland, CA (US); Daniel Fredrick Zucker, Palo Alto, CA (US); Nikita Slushkin, Ladera Ranch, CA (US); Nicholas Michael Ritchie, Ben Lomond, CA (US); Cale Williams Hopkins, Cupertino, CA (US); Howard Zeng, Unionville (CA); Jeremy Newton-Smith, Mountain View, CA (US); Jonathan Chen, San Mateo, CA (US); Teddy Ku, Mountain View, CA (US)

(73) Assignee: Google LLC, Mountain View, CA (US)

( * ) Notice: Subject to any disclaimer, the term of this patent is extended or adjusted under 35 U.S.C. 154(b) by 300 days.

(21) Appl. No.: 18/480,104

(22) Filed: Oct. 3, 2023

(65) Prior Publication Data

US 2025/0113067 A1 Apr. 3, 2025

(51) Int. Cl.
H04N 21/2187 (2011.01)
H04N 21/431 (2011.01)

(52) U.S. Cl.
CPC ....... H04N 21/2187 (2013.01); H04N 21/431 (2013.01)

(58) Field of Classification Search
None
See application file for complete search history.

(56) References Cited

U.S. PATENT DOCUMENTS 8,060,908 B2 * 11/2011 Bountour ........... H04N 21/2662
725/38
9,009,805 B1 * 4/2015 Kirkby ............... H04N 21/4622
709/224

(Continued)

OTHER PUBLICATIONS

"Live streaming with Azure Media Services v3", https://learn.microsoft.com/en-us/azure/media-services/latest/stream-live-streaming-concept, Jan. 9, 2023.

(Continued)

*Primary Examiner* — James M Hannett
(74) *Attorney, Agent, or Firm* — Colby Nipper PLLC

(57) ABSTRACT

The present document describes devices and methods for rendering multiple live-streams on a user interface (UI) with minimal resources. The UI is activated, having a first set of remote sensors loaded for rendering. The first set of remote sensors receive a first activation signal and begin streaming first data, which the UI renders. Respondent to an action changing the set of remote sensors to be rendered on the UI, a second set of remote sensors are loaded for rendering. The second set of remote sensors receive a second activation signal and begin streaming second data, which the UI renders while the first set of remote sensors continue streaming the first data. The first data is no longer streamed after a threshold time is reached.

20 Claims, 13 Drawing Sheets

(56) References Cited

U.S. PATENT DOCUMENTS

| | | | | |
|---|---|---|---|---|
| 10,602,035 | B2 * | 3/2020 | Rukes | F16M 11/08 |
| 10,897,637 | B1 | 1/2021 | Pham et al. | |
| 11,115,630 | B1 * | 9/2021 | Lemberger | G06F 3/167 |
| 11,457,411 | B1 * | 9/2022 | Hires | G06F 1/3228 |
| 12,181,847 | B1 * | 12/2024 | Brett | G06N 20/00 |
| 2001/0019360 | A1 * | 9/2001 | Tanaka | H04N 23/66 |
| | | | | 348/14.03 |
| 2014/0375441 | A1 * | 12/2014 | Rezvani | H04L 67/51 |
| | | | | 340/12.29 |
| 2018/0113577 | A1 * | 4/2018 | Burns | G06F 16/739 |
| 2019/0342622 | A1 * | 11/2019 | Carrigan | H04N 21/2187 |
| 2021/0029298 | A1 * | 1/2021 | Mysore | H04N 23/66 |
| 2021/0329165 | A1 * | 10/2021 | Liu | H04R 1/34 |
| 2022/0295008 | A1 * | 9/2022 | Nold | H04N 5/77 |

OTHER PUBLICATIONS

"SDK Quickstart", Retrieved at: https://docs.agora.io/en/interactive-live-streaming/get-started/get-started-sdk?platform=android—on Jul. 12, 2023, 13 pages.
"Subscribing to a live data stream with AG Grid using RxJS Observables", https://blog.ag-grid.com/subscribing-live-data-stream-ag-grid-rxjs-observables/, Jul. 30, 2023, 15 pages.
"Use Multiple Camera Streams Simultaneously", Retrieved at: https://developer.android.com/training/camera2/multiple-camera-streams-simultaneously—on Jun. 22, 2023, 26 pages.

* cited by examiner

300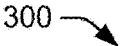
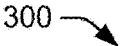
*FIG. 3A*

300

9:30

302

306

304

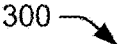
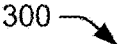
*FIG. 3C*

700 ⟍

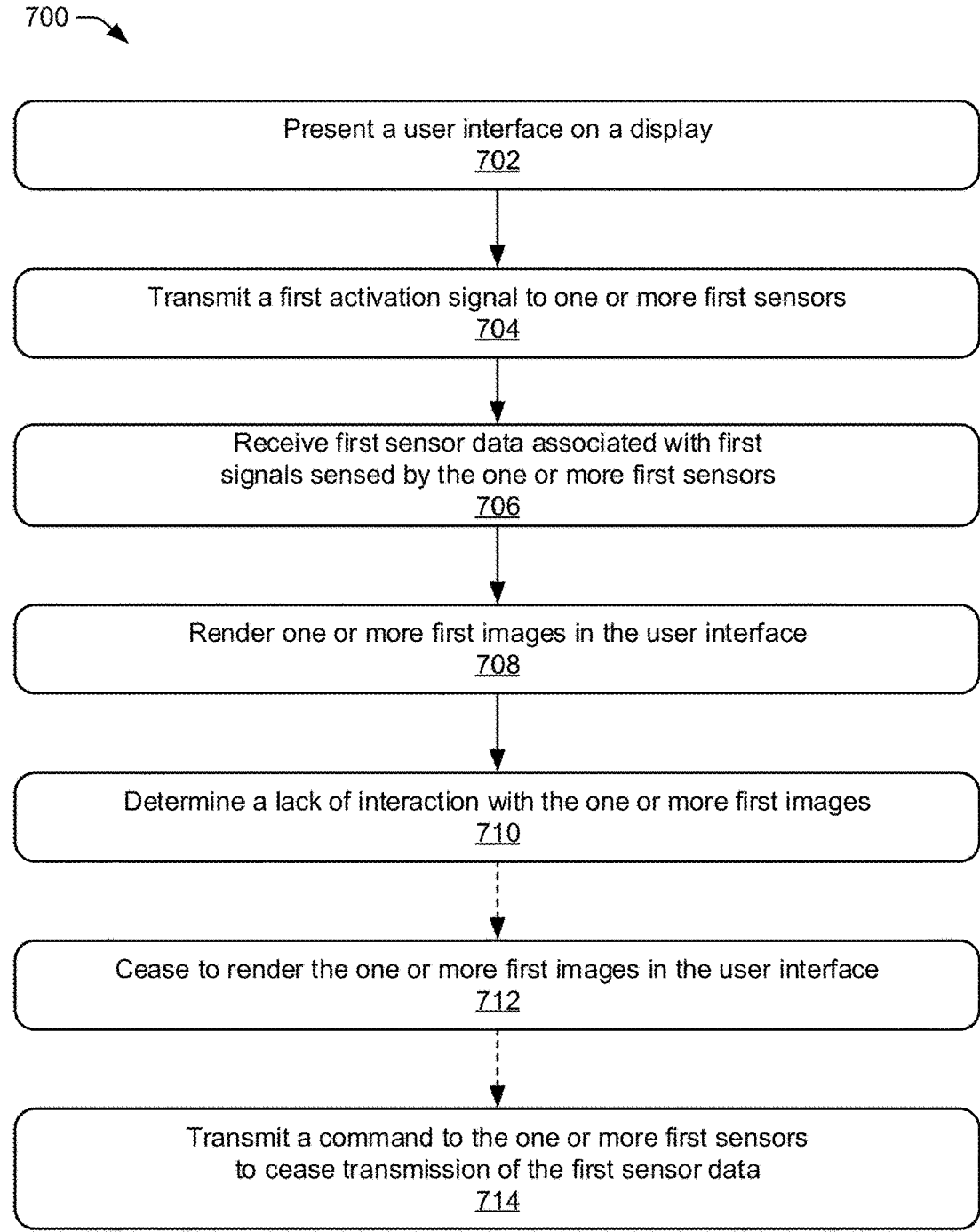

Present a user interface on a display
702

Transmit a first activation signal to one or more first sensors
704

Receive first sensor data associated with first
signals sensed by the one or more first sensors
706

Render one or more first images in the user interface
708

Determine a lack of interaction with the one or more first images
710

Cease to render the one or more first images in the user interface
712

Transmit a command to the one or more first sensors
to cease transmission of the first sensor data
714

Receive a user input
802

↓

Transmit a second activation signal to
one or more second sensors
804

↓

Receive second sensor data
associated with second signals sensed
by the one or more second sensors
806

↓

Cease to render the one or more first
images in the user interface
808

↓

Render one or more second
images in the user interface
810

900 —

700

Set one or more render aspect ratios for the rendering of the one or more first images in the user interface
902

Store the one or more render aspect ratios
904

1000 ⟍

1100 —

RENDERING MULTIPLE LIVE-STREAMS ON A USER INTERFACE WITH MINIMAL RESOURCES

BACKGROUND

Applications ("apps") often work in resource-constrained environments, especially apps running on mobile devices. This may limit features and capabilities built into the apps due to energy and power constraints. This may be particularly pronounced in the arena of live-streaming video and/or audio content, where apps running on mobile devices may experience far fewer resources available (processing power, memory, etc.) than live-streaming apps running on more powerful form-factors, such as a desktop or web-based computing system or device. Typically, desktop/web apps may offer multiple video streams in a single page to provide a user with detailed glances at multiple live events simultaneously. By contrast, the same apps on mobile devices may often be constrained to show a single live-stream at a time or show near-live snapshots of multiple cameras due to more restricted resource and energy constraints, which may cause a sub-par mobile user experience compared with more powerful platforms.

Such apps, especially mobile apps such as smart home apps, which may have security camera live-streams as one of their core features, may benefit heavily from a resource-and-energy-friendly solution to render multiple live-streams at a time.

SUMMARY

The present disclosure recites an efficient solution that leverages close communication between the streaming back-end, audio and video streaming client-side processors, and user-facing frontend layer, considering user interactions to provide low-latency multi-view live-streaming of sensor output, such as camera feeds in a list, with minimal energy and resource consumption. This provides for an enhanced user experience in a resource-constrained environment.

The present document describes devices and methods for rendering multiple live-streams on a user interface (UI) with minimal resources. These techniques include an electronic device (e.g., mobile or smart phone) having the UI render data from multiple live-streams, such as from one or more remote cameras, in such a way that there may be minimal resources employed without a loss in rendering quality to a user. The UI may be activated, which may include having a first set of remote sensors loaded for rendering. The first set of remote sensors (e.g., security cameras, video doorbells, etc.) may receive a first activation signal, and then they may begin streaming data to the device. The UI may then render the data from the first set of remote sensors. For example, the device may be a smart phone and the rendering may comprise live-streaming video from a first set of remote cameras. Respondent to an action changing the first set of remote sensors rendered on the UI, for instance, the user scrolling down a list of displayed live-stream video feeds, there may be a second set of remote sensors loaded for rendering. The second set of remote sensors may then receive a second activation signal and may begin streaming data. The UI may subsequently render the data from the second set of remote sensors. The first set of remote sensors may continue streaming their data, although the data from the first set of sensors may no longer be rendered by the UI while the data from the second set of sensors is being rendered by the UI. In this way, the first set of remote sensors may be persistently loaded for rendering (e.g., the user scrolling up on the list to once again access only the first set of remote sensors), which may result in a smoother user experience, for example when scrolling through multiple sets of sensors.

In aspects, an electronic device for rendering multiple live-streams on a UI with minimal resources is disclosed. The electronic device may comprise a display element, a network interface, one or more processors, and a memory storing instructions that, when executed by the one or more processors, cause the one or more processors to activate, on the display element, a UI, the UI configured to display data from remote sensors, send, over the network interface, a first activation signal to one or more first sensors, the one or more first sensors comprising a first subset of the remote sensors, receive, over the network interface, first sensor data based on signals sensed by the one or more first sensors, render the received first sensor data through the UI, determine whether the rendering of the received first sensor data is being accessed by a user, cease rendering the received first sensor data through the UI respondent to the determination that the rendering of the first sensor data is not being accessed by the user, and send, over the network interface and respondent to an idle time exceeding a threshold time, a command to the one or more first sensors to stop sending the first sensor data, the idle time comprising a length of time the rendering of the first sensor data has not been accessed by the user. The threshold time may be based on one or more parameters relating to at least one of the first sensors, a user interaction with the electronic device, one or more applications currently executing on the electronic device, and a state of the electronic device.

In some embodiments, the instructions may further cause the one or more processors to send, over the network interface, a second activation signal to one or more second sensors, the one or more second sensors comprising a second subset of the remote sensors, receive, over the network interface, second sensor data based on signals sensed by the one or more second sensors, cease rendering the received first sensor data through the UI, and render the received second sensor data through the UI.

Additionally or alternately, the electronic device may further set one or more render aspect ratios for the rendering of the received first sensor data through the UI, the one or more render aspect ratios based on one or more physical aspect ratios of the one or more first sensors, and store, in the memory, the one or more render aspect ratios.

In some examples, the received sensor data include both audio and visual data. The electronic device may be configured to only render the visual data to the UI, but, respondent to a user selection of one of the one or more received first sensor data rendered through the UI, the electronic device may receive an audio signal for the user-selected one of the one or more received first sensor data rendered through the UI and render both the audio signal and a video signal associated with the user-selected one of the one or more received first sensor data through the UI.

According to some examples, the electronic device may request, over the network interface, authentication information for the one or more first sensors, receive, over the network interface, the authentication information for the one or more first sensors, and store the authentication information for the one or more first sensors in the memory.

In aspects, a method for rendering multiple live-streams on a UI with minimal resources is disclosed. The method may comprise activating a UI, the UI configured to display data from remote sensors, sending, by a main electronic device over a network interface, a first activation signal to one or more first sensors, the one or more first sensors comprising a first subset of the remote sensors, receiving, by the main electronic device over the network interface, first sensor data based on signals sensed by the one or more first sensors, rendering the received first sensor data through the UI, determining whether the rendering of the received first sensor data is being accessed by a user, respondent to the determination that the rendering of the received first sensor data is no longer being accessed by the user, ceasing to render the received first sensor data through the UI, and sending, over the network interface and respondent to an idle time exceeding a threshold time, a command to the one or more first sensors to stop sending the first sensor data, the idle time comprising a length of time since the determination that the rendering of the received first sensor data is no longer being accessed by the user.

In aspects, a non-transitory, computer-readable medium for simultaneously displaying multiple feeds from remote sensors is disclosed. The medium may store instructions that, when executed by one or more processors, cause the one or more processors to activate, on a display element, a UI, the UI configured to display data from remote sensors, send, over a network interface, a first activation signal to one or more first sensors, the one or more first sensors comprising a first subset of the remote sensors, receive, over the network interface, first sensor data based on signals sensed by the one or more first sensors, render the received first sensor data through the UI, determine whether the rendering of the received first sensor data is being accessed by a user, respondent to the determination that the rendering of the first sensor data is not being accessed by the user, cease rendering the received first sensor data through the UI, and send, over the network interface and respondent to an idle time exceeding a threshold time, a command to the one or more first sensors to stop sending the first sensor data, the idle time comprising a length of time since the determination that the rendering of the first sensor data is not being accessed by the user.

This summary is provided to introduce simplified concepts of rendering multiple live-streams on a UI with minimal resources, which are further described below in the Detailed Description. This summary is not intended to identify essential features of the claimed subject matter, nor is it intended for use in determining the scope of the claimed subject matter.

BRIEF DESCRIPTION OF THE DRAWINGS

The details of one or more aspects of rendering multiple live-streams on a UI with minimal resources are described in this document with reference to the following drawings. The same numbers are used throughout the drawings to reference like features and components:

FIG. 3A depicts a mobile device in accordance with some implementations;

FIG. 3C depicts a mobile device in accordance with some implementations;

FIG. 7 depicts an example method for rendering multiple live-streams on a UI with minimal resources;

DETAILED DESCRIPTION

Figure 1:
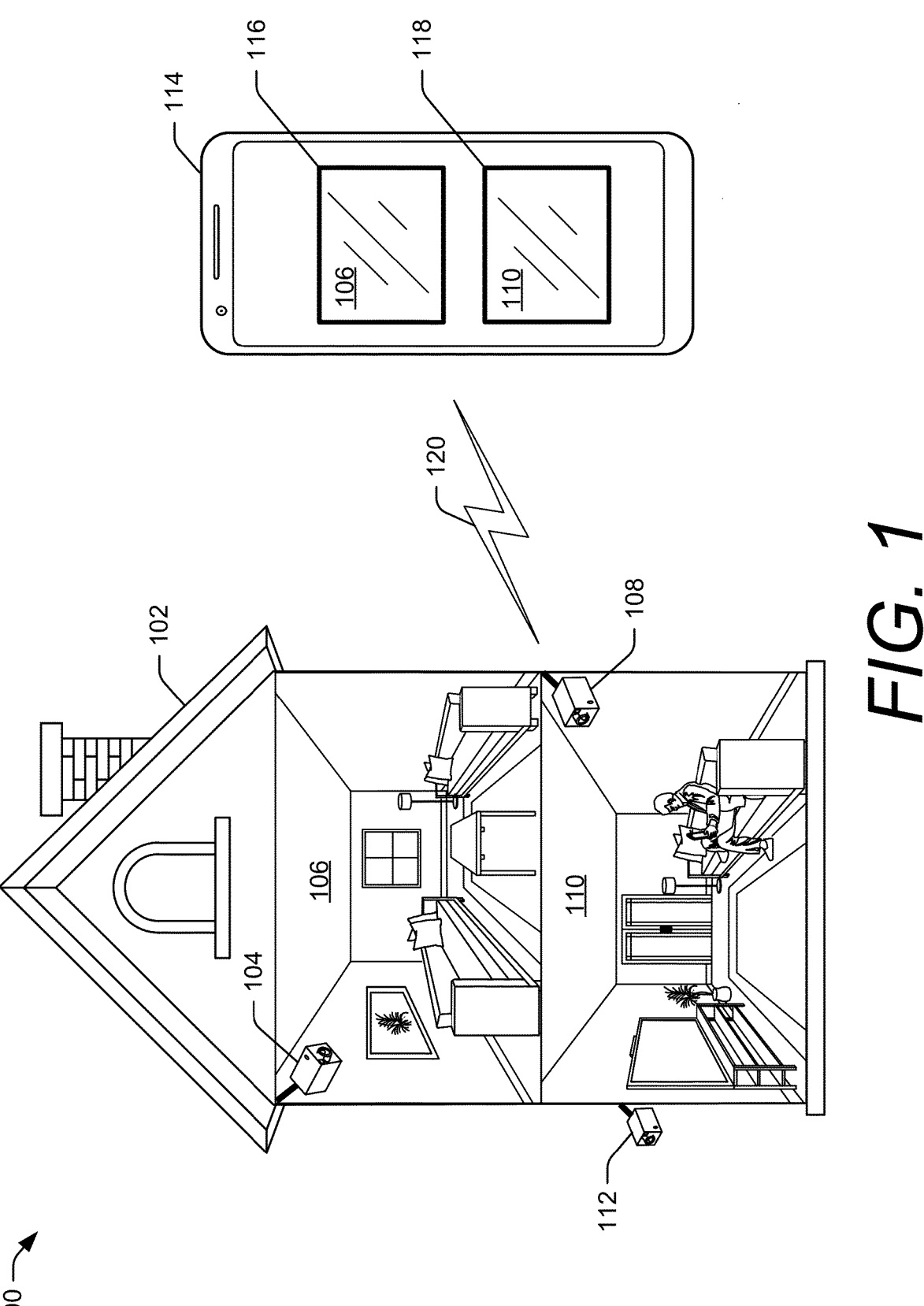
FIG. 1 illustrates a representative environment in accordance with some implementations.

The present document describes techniques and apparatuses for rendering multiple live-streams on a user interface (UI) with minimal resources. The techniques described herein enable an electronic device to render to the UI data associated with one or more remote sensors, thus constituting a live-stream from multiple sources. The one or more remote sensors may be video sensors, audio sensors, or other sensors. Example remote sensors include security cameras, video doorbells, baby monitors, smart hubs, or similar devices. When rendering the data from the one or more remote sensors, the UI may experience latency issues and thus deliver a suboptimal user experience. For example, the UI can lag behind a user's finger when scrolling, render video in something other than a smooth manner, fail to render video when a new camera is selected, or result in other undesirable outcomes to the rendering process.

In one example, a user may wish to access the UI on a mobile device to display a list of live-streams of security cameras at the user's home. The UI may begin to render while the security cameras are still in a sleep state. For example, a video doorbell may be in a standby state and a security camera, which may be located at a same physical address as the video doorbell, may also be in a standby state. The user may open the render UI and have both the video doorbell and the security camera pre-selected in a list form, for example as video boxes in the UI, but video for both devices may not initially display as the devices are not yet in a wake state. Once the devices are in a wake state, they may begin streaming video to the UI. In some examples, the devices are already in a wake state and streaming data to a device (cloud server, personal computer, etc.) other than the device displaying the UI. In these examples, the video for both devices may not initially display as the data streaming has not yet begun for the device displaying the UI. The user may scroll away from the first two device renders in the UI, such as scrolling down and accessing a third video box related to a third camera, such as a smart hub in a kitchen of the user. The UI may again have a lag in rendering while the smart hub is moved from a standby state to a wake state, or because a streaming of data from the smart hub is not currently being sent to the UI. If the UI is, for example, now rendering data from the smart hub and the security camera, the rendering for the video doorbell may have ceased as it is no longer displayed on the UI. Subsequently, the video doorbell may also cease to stream its data to the mobile device. Should the user, for example, scroll back up to access the video doorbell render, there again may be sources of lag due to starting the video doorbell data stream to the UI back up, which may, in some examples, again include having to wake the video doorbell, etc.

Using the techniques described herein, the electronic device can eliminate certain sources of undesirable rendering and lag. For example, the electronic device can send an activation signal to all remote sensors set to be rendered when the UI is accessed, such as the UI being presented on a display. In the example of the previous paragraph, the mobile device can send a first activation signal to the video doorbell and the security camera prior to rendering. In this way, the video doorbell and the security camera may begin streaming data (including, in some examples, transitioning the video doorbell and security camera to a wake state) prior to the start of rendering by the UI. This may result in a UI experience that does not suffer from unrendered video or lagging video when the UI is opened or otherwise accessed. Additionally, the electronic device may send a second activation signal to a second set of remote sensors respondent to the user providing a user input. For example, the user input may be the user scrolling down the displayed list of videos in the UI of the mobile device. This may cause the UI to access the smart hub camera feed. The mobile device may send a second activation signal to the smart hub, resulting in a smooth rendering of the video for the smart hub.

The video doorbell, in this example, may continue to stream its data to the mobile device, even after the UI has ceased rendering the video doorbell data as the video box for the video doorbell is no longer on a screen of the mobile device.

In some examples, this streaming persists up to a threshold time, and, should the user scroll back to the video box for the video doorbell, this may result in a smooth video rendering experience for the user through the UI as the video doorbell will not have to change from the standby state to the ready/wake state and/or the data feed to the UI for the live-stream of the video doorbell will not have to be restarted. This may result in the user experiencing a smoother UI rendering of the live-streams under different selection criteria.

The techniques described herein provide an enhanced user experience by providing a UI with an ability to render smoothly from multiple remote sensors simultaneously. In aspects, the rendering is performed only after the remote sensors selected by the UI for render have begun streaming. This may be particularly useful in apps using such a UI on a mobile device, as mobile devices often may experience constrained resources compared with more robust electronic devices, such as a desktop computer.

While features and concepts of the described techniques for rendering multiple live-streams on a UI with minimal resources can be implemented in any number of different environments, aspects are described in the context of the following examples.

Example Environment

FIG. 1 illustrates a representative environment 100 in accordance with some implementations. The environment 100 contains a dwelling 102 with a camera 104 in a room 106, a camera 108 in a room 110, and a camera 112 on an outside portion of the dwelling 102. A mobile device 114 is in contact with the cameras 104, 108, and 112 via a network 120 and has display windows 116 and 118, which display live-stream feeds of the rooms 106 and 110 from the cameras 104 and 108, respectively. The cameras 104, 108, and 112 may be any number of devices known to a person of ordinary skill in the art, such as, but not limited to, security cameras, smart hubs, video doorbells, baby monitors, or similar devices. It should be noted that the cameras 104, 108, and 112 are meant to be representative of remote sensors in general, and the remote sensors may equivalently be other than cameras, such as audio sensors, motion sensors, or any other type of remote sensor known to a person of ordinary skill in the art.

The camera 104 may sense first audio and visual signals from the room 106. The camera 104 may generate first data from the first signals and stream the first data via the network 120 to the mobile device 114. The camera 108 may sense second audio and visual signals from the room 110. The camera 108 may generate second data from the second signals and stream the second data via the network 120 to the mobile device 114. The camera 112 may sense third audio and visual signals from the outside of the dwelling 102. The camera 112 may generate third data from the third signals and stream the third data via the network 120 to the mobile device 114. The mobile device 114 may have an app, which comprises a UI displaying the live-streams from the cameras 104, 108, and 112. In the figure, the UI is shown as displaying the live-streams from the cameras 104 and 108 in the form of the video boxes 116 and 118 showing the rooms 106 and 110, respectively. It should be noted that the video boxes 116 and 118 are not the only possibilities for the UI to render on the mobile device. For instance, the user may scroll down on the UI to reveal a third video box, which may render the third data (not shown).

The data communications between the cameras 104, 108, and 112 may be carried out using any of a variety of custom or standard wireless protocols (e.g., Wi-Fi, ZigBee for low power, 6LoWPAN, Thread, etc.) and/or by using any of a variety of custom or standard wired protocols (CAT6 Ethernet, HomePlug, and so on). Additionally or alternately, one or more of the cameras 104, 108, and 112 may function as a communication hub and can thus serve as an access point for the network 120 for all streaming data. Examples of the network 120 include local area networks (LAN) and wide area networks (WAN) such as the Internet. The network 120 may be implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol.

Example Devices

Figure 2:
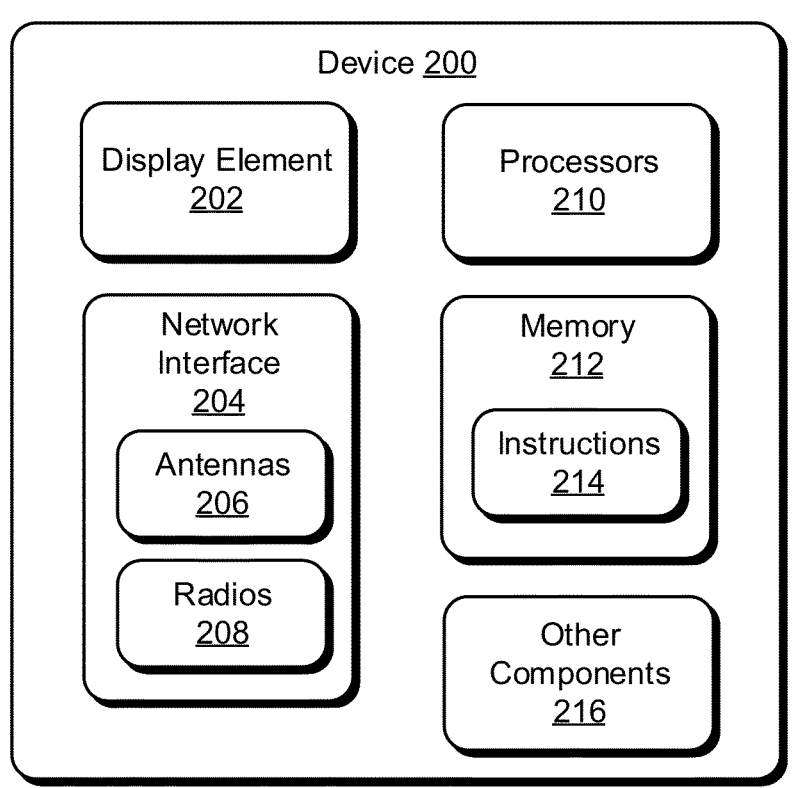
FIG. 2 is a block diagram illustrating an electronic device in accordance with some implementations.

FIG. 2 is a block diagram illustrating an electronic device 200 in accordance with some implementations. The device 200 may have a display element 202, a network interface 204 with antennas 206, radios 208, both, or more features, one or more processors 210 (e.g., CPUs, ASICS, FPGAs, microprocessors, and the like), a memory 212 storing at least instructions 214, and possible other components 216. The memory 212 may include high-speed random-access memory (e.g., DRAM, SRAM, DDR SRAM, or other random access solid state memory devices) and/or non-volatile memory (e.g., one or more magnetic disk storage devices, one or more optical disk storage devices, one or more flash memory devices, or one or more other non-volatile solid state storage devices). The memory 212, optionally, may include one or more storage devices remotely located from one or more processors 210. The memory 212, or alternatively the non-volatile memory within the memory 212, may include a non-transitory computer-readable storage medium.

In some implementations, the memory 212, or the non-transitory computer-readable storage medium of the memory 212, stores programs, modules, and data structures, or a subset or superset thereof.

In some aspects, the display element 202 may also constitute a user input, such as a touch screen. In some examples, there may be an auxiliary user input as one of the other components 216, such as a keyboard, computer mouse, motion detector, or other user input known to a person of ordinary skill in the art. The user input may be configured such that it accepts an input from a user, the input designed to interact with the UI. Additionally, the display element 202 may display the UI and its components, such as the renders 116 and 118.

FIG. 3A depicts a device 300 in accordance with some implementations. The device 300 is shown as a smart phone in keeping with device 114, though other form factors may be equally employed. Device 300 may have a UI active, which may display data from one or more remote sensors. FIG. 3A depicts the example where the one or more remote sensors are video cameras, such as the camera 104 viewing the room 106 and the camera 108 viewing the room 110. A video box 302 shows a display of the room 106 and a video box 304 shows a display of the room 110. The video boxes 302 and 304 may display video and play audio associated with the rooms 106 and 110, respectively, or simply display video with no audio component.

Figure 3B:
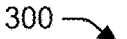
FIG. 3B depicts a mobile device in accordance with some implementations.

FIG. 3B has the same device 300 and video boxes 302 and 304 as in FIG. 3A. In some examples, a user provides the device 300 with a touch input 306. As indicated by the arrow, the touch input may comprise a scrolling of the UI upward. In this example, the upward scrolling 306 will move the UI such that video box 302 can move out of view and another remote sensor data display may be accessed below video box 304.

FIG. 3C depicts the UI on device 300 after the user input has been received and processed by the UI. Video box 302 is now the display for the room 110 and video box 304 now displays an outside of the dwelling 102, for example the video and/or audio feed from the camera 112. In some examples, the scrolling will cause a simultaneous display of the video boxes depicting the room 106 and the outside of dwelling 102 while the scrolling is proceeding, such as by displaying partial video boxes during the scrolling. In some examples, the video for the partial video boxes may cease to render as a video stream and instead be rendered as a still image. The rendering as a still image may be for the partial video boxes or for all video boxes being displayed through the UI. In some examples, none of the video boxes will show a still image but rather continue to render video during scrolling, including for the video boxes partially displayed.

Figure 4:
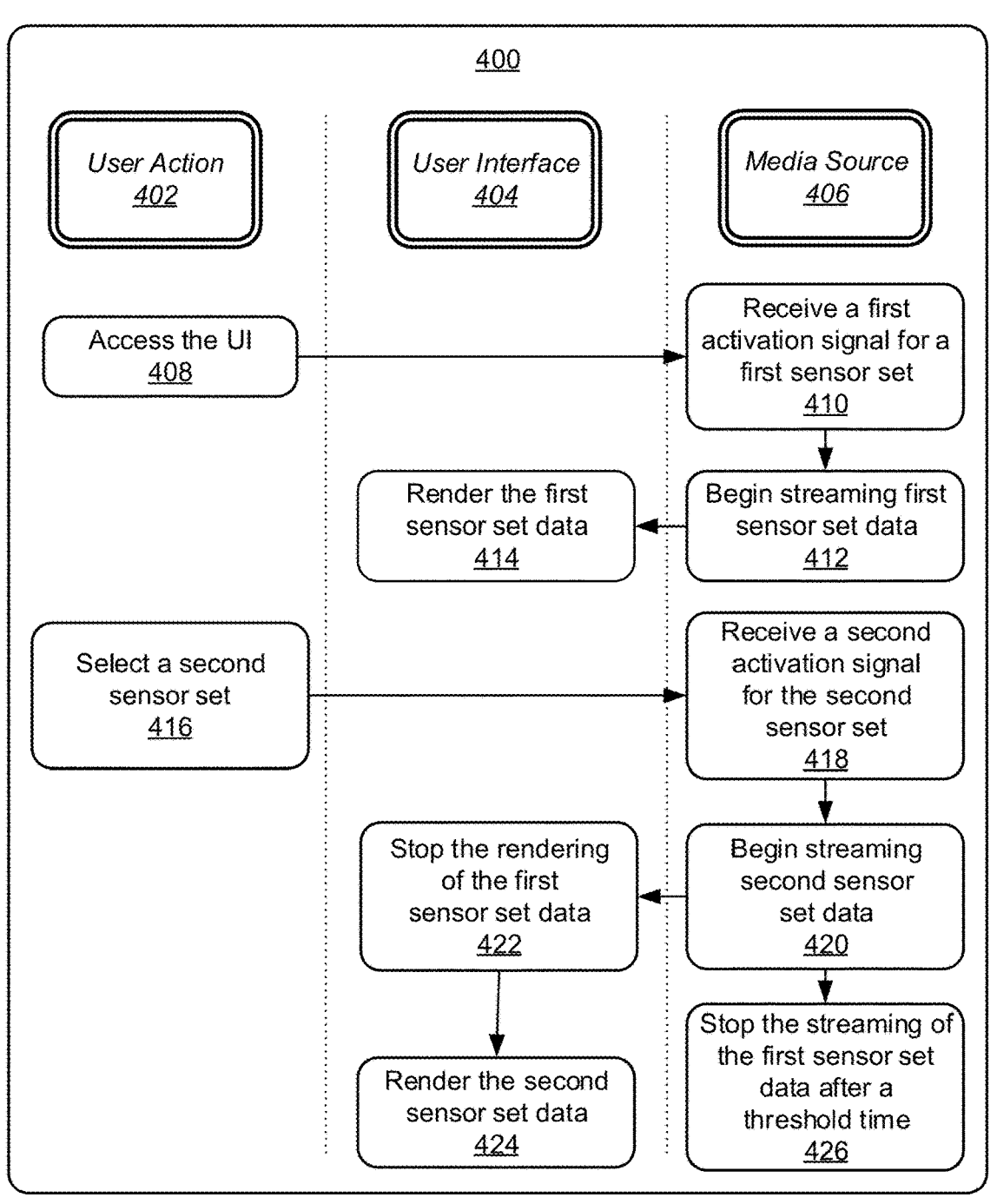
FIG. 4 depicts a logical flow for rendering data streams to a UI.

FIG. 4 depicts a logical flow 400 for rendering data streams to a UI 404. For example, interactions may be between user actions 402, the UI 404, and a media source 406, such as remote sensors or cameras 104, 108, and 112. At block 408, a user may access the UI 404. The accessing of the UI 404 may be in the form of the device 200 presenting the UI on a display element 202. This may trigger a device 200 to send a first activation signal for a first sensor set, the first sensor set corresponding to renders displayed by default when the UI 404 is opened (e.g., the video boxes 116 and 118). At block 410, the media source 406 may receive the first activation signal for the first sensor set. Upon receipt of the first activation signal, the first sensor set may, at block 412, begin streaming first sensor set data to the device 200/UI 404. The UI 404 may then, at block 414, begin rendering the first sensor set data. The rendering of the first sensor set data in block 414 may take the form of rendering one or more first images in the UI.

The activation signal from block 410 may be, in some examples, a signal directing the streaming of data from the first sensor set to the UI 404. In some examples, the first sensor set may already be in a wake state and streaming data to an intermediary device (cloud hosting device, server, personal computer, etc.). In this case, the receiving of the activation signal in block 410 comprises a signal directing streaming of the first sensor set data, as in block 412, to the UI 404. In some examples, the first sensor set may not be in a wake state. In this case, the receiving of the activation signal in block 410 may further comprise a wake signal directing the first sensor set to transition to a wake state and begin collecting and/or generating the first sensor set data. For the purposes of the present disclosure, the use of the term "activation signal" may thus comprise a signal directing one or more sensors to begin streaming data to the UI 404 and/or a signal directing the one or more sensors to transition to a wake state and begin streaming data to the UI 404.

In an example where the first sensor set comprises video cameras, block 414 may entail displaying video boxes comprising live-streams for the associated remote cameras. In this way, multiple live-streams may be displayed on the UI 404 at a same time. As the multiple live-streams may be based on the already awake and/or streaming first sensor set, a display on the UI 404 may not suffer from any degradation, lag, or other aberrant condition that could degrade the user experience.

In some instances, the user may select a second set of remote sensors (as in block 416) for rendering by the UI 404. By way of example, the user may scroll away from the first sensor set, thus deselecting one or more members of the first sensor set from what the UI 404 was rendering in block 414. Subsequently, the second set of remote sensors may be accessed for rendering by the UI 404. The device 200 may then send a second activation signal to the second set of remote sensors, and the second set of remote sensors may receive the second activation signal as in block 418. The second set of remote sensors may then begin streaming second sensor set data in block 420, as well as the UI 404 stopping the rendering of the first sensor set (as in block 422) and rendering the second sensor set data (as in block 424). The rendering of the second sensor set data 424 may take the form of rendering one or more second images in the UI.

It should be noted that blocks 416, 418, 420, 422, and 424 do not include stopping the streaming of the first sensor set data to the device 200/UI 404. The reason for this is that the user may again select the first sensor set on the UI 404, such as by scrolling back up on the UI 404, thus accessing the initial render of the first sensor set data (as in block 414). If the user does this and the first sensor set has stopped streaming the first sensor set data, there may be a lag, rendering glitch, or other aberrant condition, which could degrade the user experience. By allowing the first sensor set to continue the streaming of the first sensor set data (as in block 412), this degradation in the user experience may be avoided.

In some instances, it may be preferable to stop the streaming of the first sensor set data (as in block 412) to free up resources on the device 200. By way of example, the user may have closed the UI 404 and may be using the device 200 for other apps. The user may have placed the device 200 in a standby mode and wishes to conserve battery. The device 200 may be using resources already to render the second sensor set data (as in block 424), and the streaming of the first sensor set data (as in block 412) may be using resources of the device 200 (e.g., battery life, processing cycles, etc.) without a material advantage to the user. To use fewer resources, there may be a threshold time employed. In block 426, the media source 406 may, after a threshold time has passed from the UI 404 stopping the rendering of the first sensor set data (as in block 422) and not having resumed rendering the first sensor set data (e.g., the user has not scrolled up to access the video boxes representing the first sensor set), stop streaming the first sensor set data (as in block 426).

It should be clear that, after execution of block 426, the rendering of the second sensor set data (as in block 424) is indistinct from block 414. Therefore, if a user scrolls away from the rendering of the second sensor set data (rendered in block 424) to a third sensor set, this is no different than block 416 in functionality. Additionally or alternately, the user may close the UI 404 entirely. In this instance, block 426 would be employed for all streaming of sensor data, such as the streaming of the first sensor set data in block 412 and the streaming of the second sensor set data in block 420. The threshold time may be set as a parameter of the UI 404, such as a scalar value of 5 μs, 1 s, or other time values. Additionally or alternately, the threshold value may be dynamic. A dynamic threshold value may be based on certain parameters of the UI 404, the device 200, the one or more remote sensors, or any combination of these or other facets. By way of example, the threshold value may be based on a length of time the user has scrolled on the UI 404, whether the user has scrolled away from the set of sensors being rendered or closed the app, a battery life left on the device 200, or any number of other factors that would be deemed relevant to the threshold value by a person of ordinary skill in the art.

If the threshold value is dynamic, it may be a calculated value taking one or more of the previously mentioned factors or other factors as an argument for a function. For example, a simple function to calculate the threshold value based on a length of time a user has actively scrolled in the UI 404 might be an equation $f(s)=0.1/s$, where $f(s)$ is the threshold value and $s$ is the length of time the user has scrolled. In this example, a longer user scroll time will return a shorter threshold value. For instance, if the user has been scrolling actively on the UI for 5 s, the threshold value will be set as 20 μs. It should be noted that the foregoing example is meant to be illustrative and not limiting. Other functions, such as exponential functions, logarithmic functions, multivariate functions, or any other number of other functions may be equally employed by a person of ordinary skill in the art without affecting the scope of the present disclosure.

Figure 5:
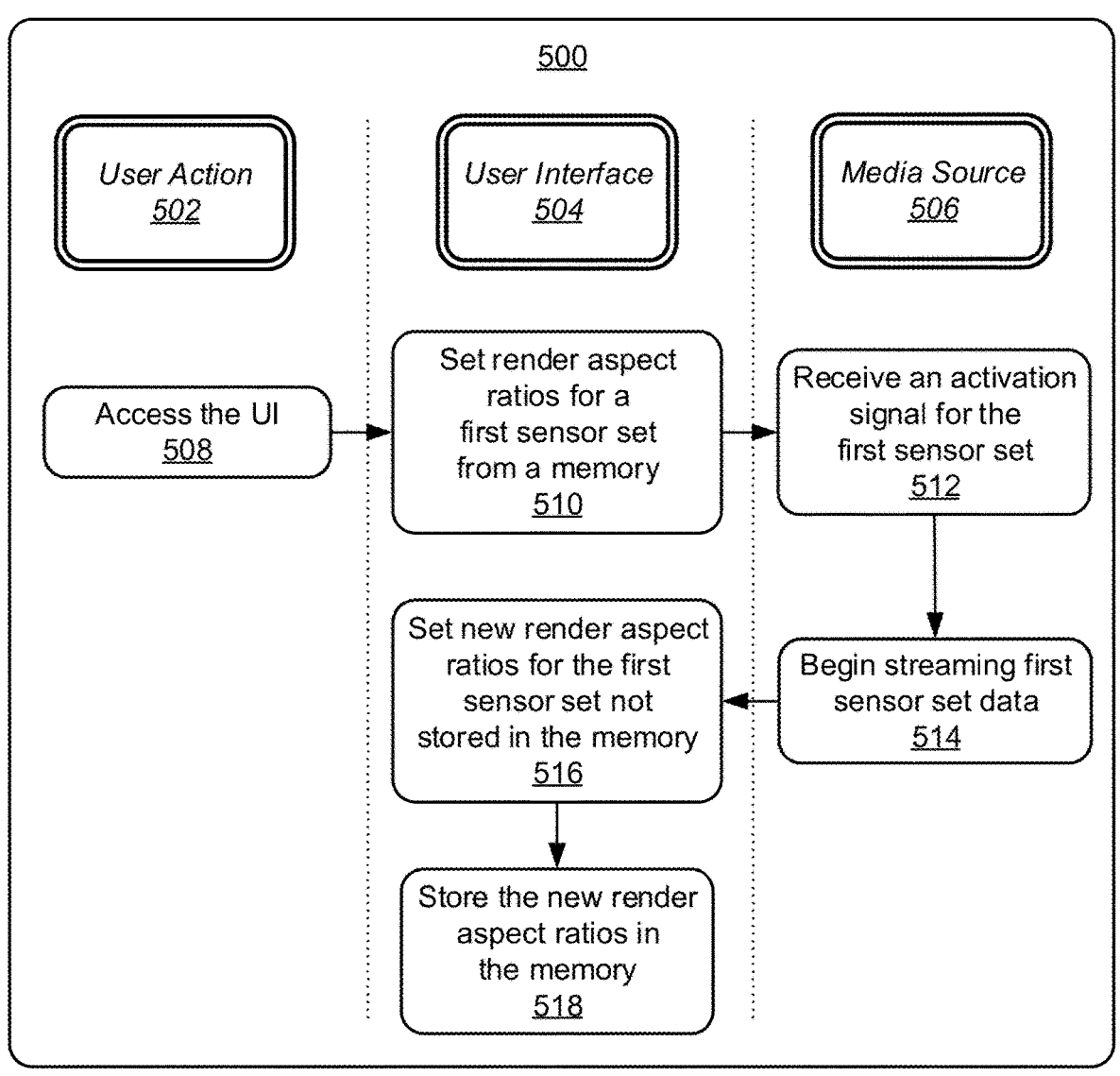
FIG. 5 depicts a logical flow for setting aspect ratios for data streams to the UI.

FIG. 5 depicts a logical flow 500 for setting aspect ratios for data streams to a UI 504. Again, interactions may be between a user action 502, the UI 504, and a media source 506, such as remote sensors or cameras 104, 108, and 112. In block 508, a user accesses the UI 504. Upon accessing the UI 504 (as in block 508), there may be a first sensor set already selected as a default set for rendering. Each member of the first sensor set may have a corresponding aspect ratio. By way of example, a sensor such as the camera 104 may have a 16:9 aspect ratio, whereas the video doorbell camera 112 may have a 4:3 aspect ratio. The aspect ratios of different sensors may differ from one another in this way, and if the UI 504 must constantly set different aspect ratios than a default it may result in a poor user experience, such as lagging scrolling, jittery rendering, or similar negative effects to the user experience.

In block 510, the UI 504 may set aspect ratios for the first sensor set based on render aspect ratios stored in a memory 212. As in FIG. 4 blocks 410 and 412, the media source 506 will, in block 512, receive an activation signal for the first sensor set and, in block 514, begin streaming first sensor set data. The setting of the render aspect ratios for the first sensor set from the memory (as in block 510) may comprise setting render aspect ratios that are based on each of the members of the first sensor set, default values based on the UI, default values based on a make and/or model of the members, or combinations of these or other factors.

If all the members of the first sensor set have render aspect ratios stored in the memory 212, the render aspect ratios may be set in the UI 504 for rendering. However, it may be the case that some or all of the members of the first sensor set do not have corresponding render aspect ratios stored in the memory 212. Additionally or alternately, it may be the case that one or more of the members of the first sensor set has a render aspect ratio stored in memory that is out of date or otherwise no longer applicable. For instance, the user may have selected an option in the UI 504 to set all render aspect ratios to a same value, the user may have selected a different render aspect ratio as a new default for one or more of the remote sensors of the first sensor set, or some other condition may be present that changes an already stored render aspect ratio.

In the case where a render aspect ratio for one or more of the sensors in the first sensor set is not stored in the memory 212 or needs to be updated, the UI 504 may, in block 516, set new aspect ratios for the first sensor set from render aspect ratios not stored in the memory. Once all render aspect ratios for the first sensor set are set in the UI 504, the UI 504 may begin the rendering of the first sensor set data (as in block 414). If all the render aspect ratios for the first sensor set were already stored in the memory 212, there may be no further actions taken by the UI 504. However, in the case that one or more of the render aspect ratios were not found in the memory 212, either because they were not yet stored or they required updating, the UI 504 may store new aspect ratios in the memory 212 (as in block 518).

Updating or otherwise having to set new render aspect ratios when rendering sensor set data may take time and may cause a degraded user experience, such as introducing lag or jittery scrolling in the UI 504. By storing the render aspect ratios in memory, the UI 504 may retrieve and set the stored render aspect ratios when the UI 504 is accessed or a new sensor set is accessed. By way of example, consider the UI 504 having a first sensor set comprising the cameras 104 and 108. If the render aspect ratios corresponding to 104 and 108 are already stored in the memory 212, the UI 504 may set the render aspect ratios corresponding to 104 and 108. Suppose the user scrolls away from the first sensor set comprising 104 and 108 and accesses a second sensor set comprising the cameras 108 and 112. The render aspect ratio for the camera 108 may already be set in this example, and no changes by the UI 504 need to be made for that render aspect ratio.

There are two scenarios for the render aspect ratio for the camera 112: 1. the render aspect ratio for the camera 112 is stored in the memory 212, and 2. the render aspect ratio for the camera 112 is not stored in the memory 212. In the scenario 1, the UI 504 may set the render aspect ratio for the camera 112 from the value stored in the memory 212. In the scenario 2, the UI 504 may set a new render aspect ratio for the rendering of data related to the camera 112 (as in block 516). This render aspect ratio may be included in the sensor set data being streamed from the media source 514. Additionally, the UI 504 may cause the new render aspect ratio related to the camera 112 to be stored in the memory 212 (as in block 518). In this way, the new render aspect ratio associated with the camera 112 may be accessible in the future to the UI 504 from the memory 212, which may subsequently speed up the rendering for future UI 504 access (as in block 508) or in scrolling to access different sensor set rendering on the UI 504.

Figure 6:
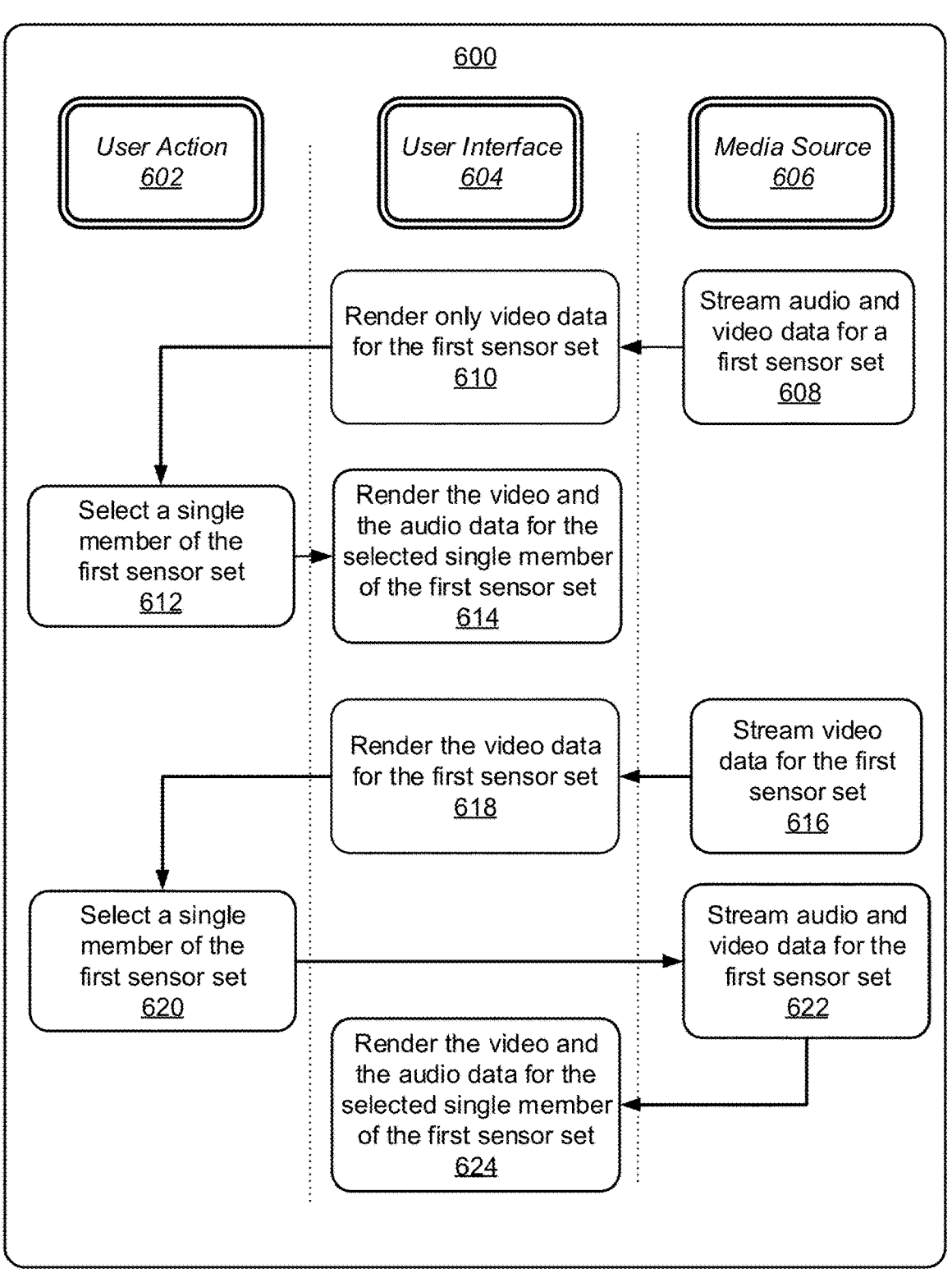
FIG. 6 depicts a logical flow for rendering both audio and visual data streams to the UI.

FIG. 6 depicts a logical flow 600 for rendering both audio and visual data streams to a UI 604. As in FIGS. 4 and 5, there may be a user action 602, which results in a streaming of a first sensor set data from a media source 606 to the UI 604. In some instances, such as when the sensors may be video cameras with microphones, there may be both video and audio data associated with the first sensor set. In such an instance, the media source 606 may stream audio and video data for the first sensor set to the UI 604/a device 200 (as in block 608). However, it may be disadvantageous to render both the video and the audio data. For instance, the UI 604 may not process or otherwise output the audio data when rendering multiple live-streams simultaneously, making the audio data portion superfluous.

In some aspects, the media source 606 may stream audio and video data for the first sensor set as in block 608. The UI 604 may, in block 610, render only the video data for the first sensor set. In this way, the device 200 may use fewer resources than if the audio data were also processed and/or rendered. However, in block 612 a user may select a single member of the first sensor set. Such a selection may be made with the intent to open the user-selected single member of the first sensor set for rendering on its own or along with the other members of the first sensor set. The user may have selected the single member of the first sensor set with the intent to output audio from the user-selected sensor. The UI 604 may then, in block 614, render the video and the audio for the user-selected member of the first sensor set. The user-selected single member of the first sensor set may be rendered by itself or along with the other members of the first sensor set, the other members of the first sensor set not having an audio component of their data rendered.

In some aspects, the media source 606 may not stream audio data but may only stream video data for the first sensor set, as in block 616. In this case, the UI 604 may, in block 618, render the video data for the first sensor set, which may result in the device 200 using fewer resources than if the audio data were also streamed. As in block 612, the user may, in block 620, select a single member of the first sensor set. The media source 606 may then, in block 622, stream audio and video data for the first sensor set. The audio data being streamed in block 622 may be for all the sensors in the first sensor set or for only the user-selected single member of the first sensor set. The UI 604 may then, in block 624, render the video and the audio for the user-selected member of the first sensor set. The user-selected single member of the first sensor set may be rendered by itself or along with the other members of the first sensor set, the other members of the first sensor set not having an audio component of their data rendered and/or streamed.

Example Methods

FIG. 7 depicts an example method 700 for rendering multiple live-streams on a UI with minimal resources. Block 702 may be presenting the UI on a display. For example, if the UI is part of an app on a mobile phone or smart phone, presenting the UI can be selecting the app to open. Additionally or alternately, presenting the UI could be selecting an already open app from a list of running apps. It may be possible that the app is in a standby or sleep state where it does not use any device resources or in such a state that the app is only stored in memory and is not utilizing any processor resources. There are many scenarios that may be known to a person of ordinary skill in the art by which the UI may go from an inactive state to an active state; the examples here are meant to be illustrative and not limiting.

In some aspects, the UI may have a list of pre-selected or default first sensors to be rendered upon activation. The list may be a user-scrollable list. Block 704 may be transmitting a first activation signal to one or more first sensors, the one or more first sensors corresponding to the pre-selected or default first sensors to be rendered. The one or more first sensors may be in a suspended state or standby mode, wherein the one or more first sensors do not have all resources activated. By way of example, the one or more first sensors may be cameras, and the suspended or standby mode may be such that the cameras are not actively taking in data from signals in their environment. The sending of the first activation signal of block 704 may serve to activate components of the one or more first sensors, which were not active prior to the sending of the first activation signal.

Block 706 comprises receiving, by the UI, first sensor data associated with first signals sensed by the one or more first sensors. In the example where the one or more first sensors are cameras, the received first sensor data may comprise video data, audio data, and/or both audio data and video data. The one or more first sensors may be motion sensors, in which case the received first sensor data may be information on movement, such as, but not limited to, object detection, wave forms, and/or binary classifications. The receiving of the first sensor data may be a continuous process, such that it may comprise a streaming of the first sensor data. Herein, the terms "receiving" and "streaming" may be used without distinction.

Block 708 comprises rendering one or more first images in the UI, the one or more first images based on the first sensor data. In the example where the first sensors are video cameras, the rendering may comprise displaying video on a screen of a device 200, such as by using video boxes. In some examples, the one or more first sensors comprise more than one sensor. In such cases, the rendering of the one or more first images may comprise displaying multiple live-stream videos on the same device 200. The rendered video data, in some examples, may not be rendered with corresponding audio data.

Block 710 comprises determining whether there is a lack of interaction with the one or more first images. For example, the user may close the app, leave the app idle for a period of time, turn off the device 200, or take any other action where it is determined that there is a lack of interaction with the one or more first images. The determination may be based on a user-tracking method, such as a camera being used to determine user attention, with the determination that the user is no longer accessing the rendering of one or more first images based on a determination of where the user's eyes are pointing. The user may have scrolled away from the rendered one or more first images in the UI. Other actions or metrics for determining that there is a lack of interaction with the one or more first images will be readily understood by a person of ordinary skill in the art.

Respondent to the determination of the lack of interaction with the one or more first images, in block 712 the UI ceases rendering the one or more first images. It should be noted that the cessation of the rendering of the one or more first images (as in block 712) does not correspond with a cessation of receipt of the first sensor data (as in block 706). In the example where the receiving of the first sensor data comprises a video stream, the UI may cease rendering the video but continue to receive the video stream. In this way, the receipt of the first sensor data (as in block 706) and the rendering of the one or more first images (as in block 708) are treated as separate entities. In the example where the first sensors are cameras and the rendering of the one or more first images (as in block 708) comprises displaying live-streams of the camera outputs, the ceasing to render the one or more first images in the UI (as in block 712) may comprise displaying nothing, displaying a still image representative of a last frame displayed during the live-stream, or displaying a default image associated with each of the first sensors. In the case where the UI comprises a user-scrollable list of live-streams, such as video boxes, the ceasing to render (as in block 712) may be based on the UI determining that the video box associated with the received first sensor data is no longer "in view."

Block 714 comprises, respondent to the determination that the lack of interaction with the one or more first images (as in block 710), transmitting a command to the one or more first sensors to cease transmission of the first sensor data. Classically, apps or other UIs used for rendering sensor data such as the rendering of the one or more first images (as in block 708) may cease the sending and/or receipt of the sensor data as soon as it is determined that there is a lack of interaction with the sensor data. In the present disclosure, the determination that the lack of interaction with the one or more first images (as in block 710) may start a timer. Block 714 may further comprise determining that a threshold time increment has been exceeded. The threshold time increment may be set as a parameter of the UI, such as a scalar value of 5 μs, 1 s, or other time values. Additionally or alternately, the threshold time increment may be dynamic. A dynamic threshold time increment may be based on certain parameters of the UI, the device, the one or more remote sensors, or any combination of these or other facets. By way of example, the threshold time increment may be based on a length of time the user has scrolled on the UI, whether the user has scrolled away from the set of sensors being rendered or closed the app, a battery life left on the device, or any number of other factors that would be deemed relevant to the threshold value by a person of ordinary skill in the art. Block 714 may include a setting of the threshold time increment respondent to determining the lack of interaction with the one or more first images.

By waiting for a time since the determination of the lack of interaction with the one or more first images to reach the threshold time increment before sending the command to cease transmission of the first sensor data (as in block 714), the UI may be able to continue receiving the first sensor data in case the user decides to again access the rendering of the received one or more first images.

By way of example, consider a UI comprising a user-scrollable list of multiple live-stream cameras. The UI may begin to render the one or more first images in the form of video live-streams, and the user may execute a user action that causes the determination that the user is no longer interacting with the rendering of the one or more first images, such as scrolling down the list to access live-streams from sensors not included in the set of first sensors, changing active apps on their device, looking away from the screen, or any other action known to a person of ordinary skill in the art to indicate that the user is no longer interacting with the rendering of the one or more first images. However, the user may go back to the rendering of the one or more first images, such as by scrolling back up to the video boxes representing live-streams for the first sensor set, changing the active app back to the UI, looking back to the screen, etc. In such cases where the user has again accessed the rendering of the one or more first images, the UI may immediately begin to again render the one or more first images as the UI has not stopped receiving the first sensor data (this is assuming the threshold time increment has not been met or exceeded).

In keeping the receiving of the first sensor data active after the determination of the lack of interaction with the one or more first images but before the threshold time increment, the UI may be able to again render the one or more first images without any unpleasant effects to the user experience, such as lag, no display of live-streaming, etc. However, the receiving of the first sensor data may use resources of the device on which the UI is being accessed, such as using a network interface, processing cycles, and memory of a mobile device where the UI is running in an app. The ceasing to receive the first sensor data after the threshold time increment may allow the device to free up resources that otherwise would have been used in receiving the first sensor data. By continuing to receive the first sensor data after the determination of the lack of interaction with the rendering of the one or more first images but then ceasing to receive the first sensor data when the threshold time increment has been reached or exceeded, the device may be able to best balance the use of resources between giving a smooth user experience and conserving device resources.

Figure 8:
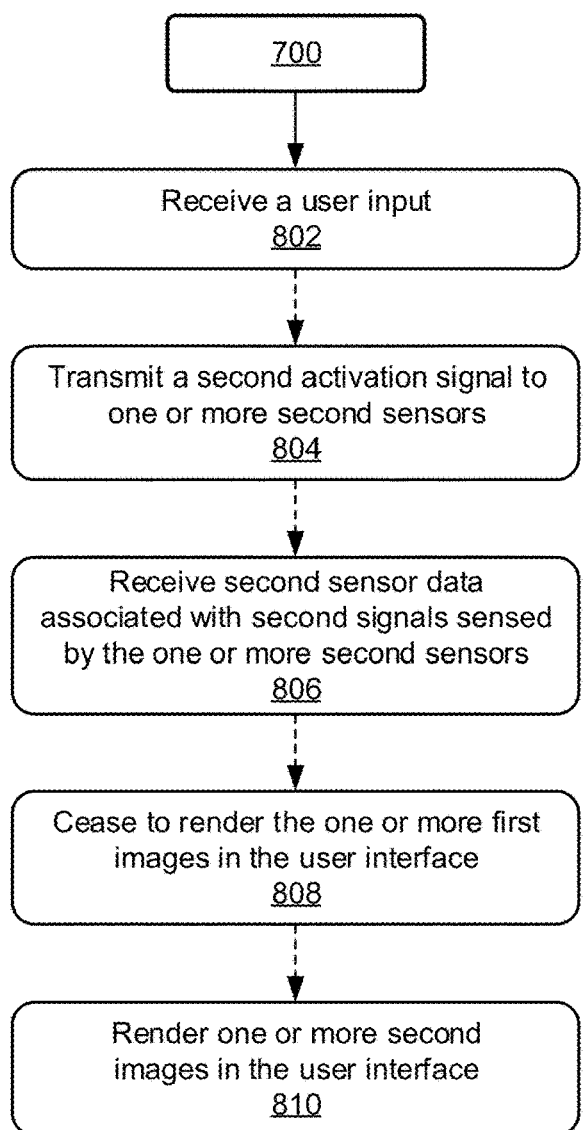
FIG. 8 depicts an example method for rendering a second set of multiple live-streams on a UI with minimal resources.

FIG. 8 depicts an example method 800 for rendering a second set of multiple live-streams on a UI with minimal resources. Method 800 starts with method 700, such as in a scenario where the UI may already be rendering the one or more first images (as in block 708). The user may give an input to the UI, such as scrolling away from the rendered one or more first images in the case where the UI comprises a scrollable list of video boxes or another method of rendering sensor data. The UI may receive this user input, as in block 802. This may comprise accessing a second set of sensors. The UI may then, as in block 804, transmit a second activation signal to one or more second sensors. The one or more second sensors may have elements from the one or more first sensors or may be a completely different set of sensors.

The UI may then, as in block 806, receive second sensor data associated with second signals sensed by the one or more second sensors. By way of example, the one or more first sensors may be the cameras 104 and 108 from FIG. 1. The UI may have the cameras 104 and 108 set as default cameras when the UI is opened and thus may render one or more first images based on data from the cameras 104 and 108 upon initial user access to the UI. The user may give the UI an input, such as scrolling down, and access a new set of sensors, such as the cameras 108 and 112. In this example, the cameras 108 and 112 comprise the one or more second sensors. In block 806, the UI in this example would receive data from the cameras 108 and 112 relating to the room 110 and the outside of the dwelling 102, respectively.

Block 808 comprises ceasing to render the one or more first images in the UI. In the example where the one or more first sensors comprise the cameras 106 and 108, this may mean that the UI on the device 114 would no longer display the video feeds corresponding to the rooms 106 and 110. This may be because one or more of the video boxes are no longer within the display area due to the user scrolling.

Block 810 comprises rendering one or more second images based on the received second sensor data through the UI. Again using the example where the one or more first sensors comprise the cameras 106 and 108 and the one or more second sensors comprise the cameras 108 and 112, the UI may have ceased to display video boxes based on the rooms 106 and 110 and may instead show the video boxes corresponding with the room 110 and the outside of the dwelling 102. In the case, as in this example, where one or more of the second sensors have a matching sensor with one or more of the first sensors, it may be that the rendering of the one or more second images in the UI has corresponding components that are also part of the rendering of the one or more first images. In this way, it may be possible that the ceasing to render the one or more first images in the UI does not comprise ceasing to render all the first images as at least one of the elements of the first sensor data, such as the data relating to camera 108 in this example, is also present in the second sensor data. It should be noted that this does not represent a necessary interpretation of blocks 808 and 810. It may be possible to have one or more second sensors wherein none of their members are also members of the one or more first sensors. The example is merely meant to be illustrative and not limiting.

It should be noted that block 810 may materially correspond with block 708 after block 714 has been realized. For example, suppose block 712 is accomplished by block 808, in which example the determining of the lack of interaction with the one or more first images (block 710) is accomplished by block 802, wherein the received user input is, for example, the user scrolling away from the rendering of the one or more first images in a user-scrollable list. In this example, block 810, the rendering of the one or more second images in the UI, may correspond with block 708, and the methodology of the rest of FIG. 6 would then apply to the rendering of the received second sensor data.

Figure 9:
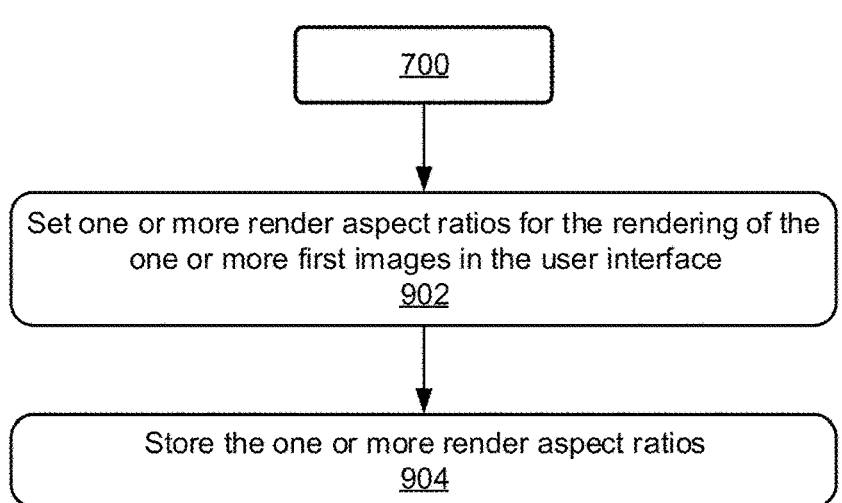
FIG. 9 depicts an example method for setting render aspect ratios for multiple live-streams on a UI with minimal resources.

FIG. 9 depicts an example method 900 for setting render aspect ratios for multiple live-streams on a UI with minimal resources. Method 900 starts with method 700, such as in a scenario where the device 200 has received the first sensor data associated with first signals sensed by the one or more first sensors (as in block 706), or when the UI is first presented on the display 702. Block 902 comprises setting one or more render aspect ratios for the rendering of the one or more first images in the UI. These render aspect ratios may be from values stored in the memory of the device or from the first sensor data itself. The setting of the render aspect ratios (as in block 902) may be completed either before or after the rendering of the one or more images (as in blocks 708 and 810). If the setting of the render aspect ratios (as in block 902) is completed after the rendering of the one or more images (as in blocks 708 and 810), there may be default render aspect ratios for the rendering of the one or more images (as in blocks 708 and 810). The default render aspect ratios may be stored render aspect ratios for the corresponding sensors, a default built into the UI, a default based on a sensor type, a default based on a sensor brand, or any other default technique known to a person of ordinary skill in the art.

Once the one or more render aspect ratios have been set (as in block 902), the one or more render aspect ratios may be stored in block 904. For example, if the render aspect ratio for the camera 104 is not stored in the memory 212, the device 200 may receive the render aspect ratio for the camera 104 prior to the rendering of one or more images corresponding with the camera 104. The render aspect ratio associated with the camera 104 may then be accessed from the memory 212 when the camera 104 is part of a sensor set in a future rendering. Having the render aspect ratios stored in the memory 212 may allow for a smoother user experience as the UI may set the render aspect ratios prior to receiving the sensor data. In an example where the UI is tasked to render one or more images based on sensor data from a set of sensors where all sensors have a render aspect ratio already stored in memory, this may greatly speed up the time it takes to render the one or more images based on sensor data from these sensors, which may result in a better user experience.

Figure 10:
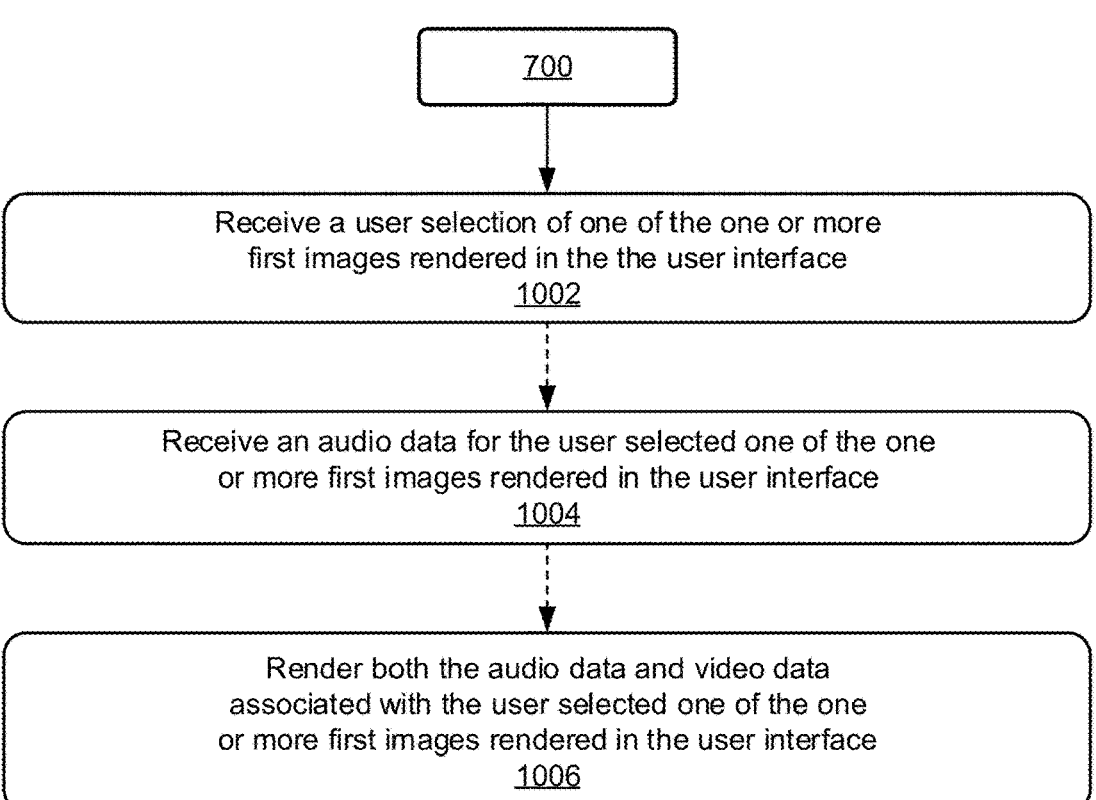
FIG. 10 depicts an example method for rendering both video and audio data for multiple live-streams on a UI with minimal resources.

FIG. 10 depicts an example method 1000 for rendering both video and audio data for multiple live-streams on a UI with minimal resources. Method 1000 starts with method 700, such as in a scenario where the device 200 has rendered the one or more first images in the user interface (as in block 708). Block 1002 comprises receiving a user selection of one of the one or more first images rendered in the UI. For example, the UI may already be rendering camera feeds for the cameras 104 and 108. The rendering may be in the form of the video boxes 116 and 118 showing live-streams of the rooms 106 and 110, respectively. The user may, in the example where the device 114 is a touchscreen device with the live-streams displayed on the touch screen, tap the video box 116 corresponding to the live-stream of the room 106.

Prior to the user selection, the UI may not be receiving audio data corresponding to the rendered one of the one or more first images. Block 1004 comprises receiving the audio data for the user-selected one of the one or more first images rendered in the UI. Again referring to the example where the user-selected one of the one or more first images rendered in the UI is the live-stream display 116 of the room 106, block 1004 may comprise receiving the audio data from the camera 104 based on audio from the room 106.

Block 1006 comprises rendering both the audio data and the video data associated with the user-selected one of the one or more first images rendered in the UI. For example, consider the one or more first sensors comprising the cameras 104 and 108 and the user selection comprising the rendering of an image based on sensor data from the camera 104. The UI may have only received video data from the cameras 104 and 108 prior to the user selection, and the rendering of the one or more first images to the UI may comprise displaying live-streams of video only for the rooms 106 and 110. When the user selects the live-stream for the room 106 corresponding to the rendered image based on sensor data from the camera 104, the audio data corresponding to the camera 104 may also be received and rendered, giving the user an audio output based on sound from the room 106.

In some aspects, the UI may render only the video and audio data from the camera 104 when the user selects the live-stream associated with the room 106. This may be in the form of displaying a full-screen view of the room 106. It may also be in the form of keeping the multiple live-streams (e.g., live-stream video for both the rooms 106 and 110) but also outputting audio from the selected sensor (e.g., the camera 104). Other methods for rendering the audio data for the user-selected rendering one of the one or more first images may equivalently be used.

Figure 11:
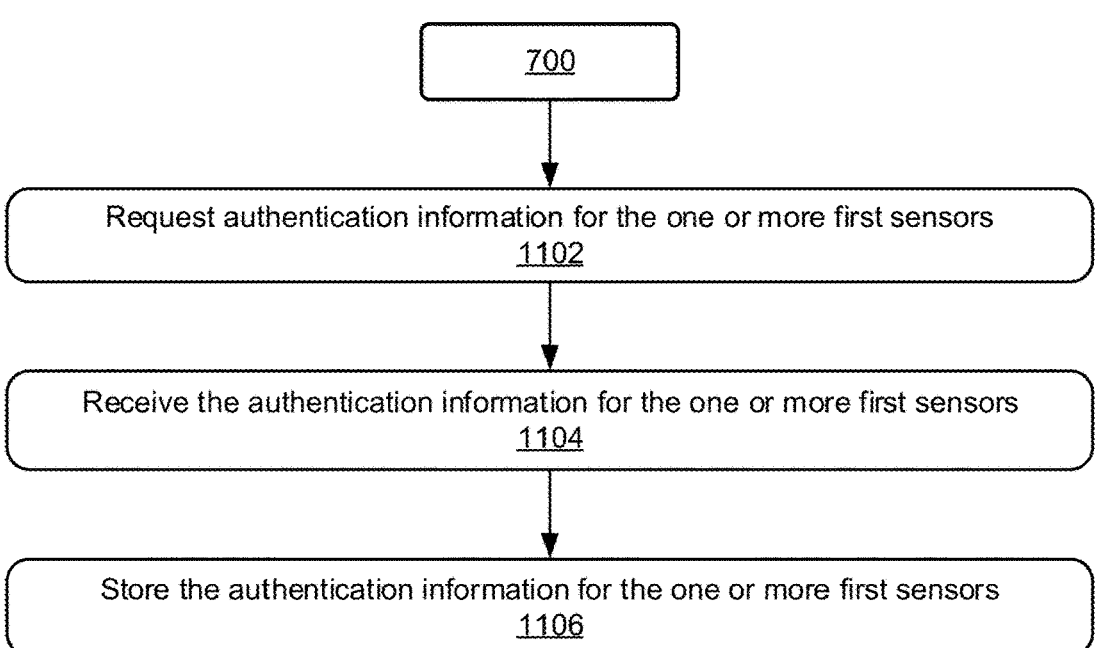
FIG. 11 depicts an example method for authenticating multiple live-streams on a UI with minimal resources.

FIG. 11 depicts an example method 1100 for authenticating multiple live-streams on a UI with minimal resources. Method 1100 starts with method 700, such as in a scenario where the device 200 has presented the UI on the display 702. The one or more first sensors may require authentication to begin streaming data. Block 1102 comprises requesting authentication information for the one or more first sensors. This authentication information may be part of an encryption protocol, such as a handshake or other method of data encryption for secure data exchange. The authentication information may comprise one or more connection parameters. The one or more connection parameters may be specific to each of the one or more first sensors, the device, a network, or any combination of these or other components known to a person of ordinary skill in the art.

Block 1104 comprises receiving the authentication information for the one or more first sensors. The authentication information may be necessary for the UI to receive the first sensor data (as in block 706) and render the one or more first images to the UI (as in block 708) every time the UI is accessed, presented, or activated 702. The authentication information may also be required to receive the second sensor data (as in block 806) and render the one or more second images to the UI (as in block 810).

The requesting (as in block 1102) and receipt (as in block 1104) of authentication information may take time, which may in turn cause lag or other undesirable effects to the overall user experience. In a UI where the authentication information must be requested (as in block 1102) and received (as in block 1104) every time any sensor data is received (as in blocks 706 and 806) and/or any images based on the sensor data are rendered (as in blocks 708 and 810), this may result in a poor user experience, such as lagging scrolling, jittery rendering, or other negative effects. To prevent such negative effects, the authentication information for the one or more first sensors may be, in block 1106, stored. If the authentication information is stored (as in block 1106), it may be implemented more quickly in future receipt (as in blocks 706 and 806) and/or rendering (as in blocks 708 and 810) of sensor data and images based on the sensor data. This may result in a smoother and more pleasing user experience.

The steps for each of the methods outlined in FIG. 7, FIG. 8, FIG. 9, FIG. 10, and FIG. 11 are not meant to be limiting, but illustrative. It should be obvious to a person of ordinary skill in the art that the steps may be taken in different orders or using fewer or more steps than those outlined.

ADDITIONAL EXAMPLES

The following are additional examples of the described devices and methods for robust multi-channel voice activity detection for speech and audio processing in communication devices.

Example 1. An electronic device, the electronic device comprising a display, a network interface, one or more processors, and a memory storing instructions that, when executed by the one or more processors, cause the one or more processors to present a user interface on the display, the user interface associated with one or more remote sensors, the remote sensors remote from the electronic device; transmit, over the network interface, a first activation signal to one or more first sensors, the one or more first sensors comprising a first subset of the remote sensors; receive, over the network interface, first sensor data associated with first signals sensed by the one or more first sensors; render one or more first images in the user interface, the one or more first images based on the first sensor data associated with the first signals sensed by the one or more first sensors; and respondent to a lack of interaction with the one or more first images in the user interface: cease to render the one or more first images in the user interface; and transmit, over the network interface, a command to the one or more first sensors to cease transmission of the first sensor data.

Example 2. The electronic device of example 1, wherein the instructions further cause the one or more processors to receive a user input and, respondent to reception of the user input, transmit, over the network interface, a second activation signal to one or more second sensors, the one or more second sensors comprising a second subset of the remote sensors; receive, over the network interface, second sensor data associated with second signals sensed by the one or more second sensors; and render one or more second images in the user interface, the one or more second images based on the second sensor data associated with the second signals sensed by the one or more second sensors.

Example 3. The electronic device of example 1, wherein the electronic device is one of a mobile device, a display device, a hub device, or a personal computing device.

Example 4. The electronic device of claim 3, wherein the instructions further cause the one or more processors to set one or more render aspect ratios for the rendering of the one or more first images in the user interface, the one or more render aspect ratios based on one or more physical aspect ratios of the one or more first sensors; and store, in the memory, the one or more render aspect ratios.

Example 5. The electronic device of example 4, wherein the storage of the one or more aspect ratios in the memory comprises storage into a cache file.

Example 6. The electronic device of example 1, wherein the first signals sensed by the one or more first sensors comprise both video signals and audio signals, the reception of the first sensor data includes reception of video data based on the video signals, and the reception of the first sensor data does not include reception of audio data based on the audio signals.

Example 7. The electronic device of example 6, wherein the instructions further cause the one or more processors to, respondent to a user selection of one of the one or more first images rendered in the user interface, receive the audio data for the user-selected one of the one or more first images rendered in the user interface, and render both the audio data and the video data associated with the user-selected one of the one or more first images rendered in the user interface.

Example 8. The electronic device of example 1, wherein the instructions further cause the one or more processors to request, over the network interface, authentication information for the one or more first sensors; receive, over the network interface, the authentication information for the one or more first sensors; and store the authentication information for the one or more first sensors in the memory.

Example 9. The electronic device of example 1, wherein the UI comprises a user-scrollable list of live feeds.

Example 10. The electronic device of example 1, wherein the instructions further cause the one or more processors to determine the lack of interaction based on one or more parameters relating to at least one of the first sensors, a user interaction with the electronic device, one or more applications currently executing on the electronic device, or a state of the electronic device.

Example 11. A method for simultaneously displaying multiple feeds from remote sensors, the method comprising presenting a user interface on a display, the user interface associated with one or more remote sensors, the remote sensors remote from an electronic device, transmitting, by a main electronic device and over a network interface, a first activation signal to one or more first sensors, the one or more first sensors comprising a first subset of the remote sensors, receiving, by the main electronic device and over the network interface, first sensor data associated with first signals sensed by the one or more first sensors, rendering one or more first images in the user interface, the one or more first images based on the first sensor data associated with the first signals sensed by the one or more first sensors, and respondent to a lack of interaction with the one or more first images in the user interface, ceasing to render the one or more first images in the user interface, and transmitting, by the main electronic device and over the network interface, a command to the one or more first sensors to cease transmission of the first sensor data.

Example 12. The method of example 11, further comprising receiving a user input and, respondent to receiving the user input, transmitting, by the main electronic device and over the network interface, a second activation signal to one or more second sensors, the one or more second sensors comprising a second subset of the remote sensors, receiving, by the main electronic device and over the network interface, second sensor data associated with second signals sensed by the one or more second sensors, and rendering one or more second images in the user interface, the one or more second images based on the second sensor data associated with the second signals sensed by the one or more second sensors.

Example 13. The method of example 12, further comprising setting, by the main electronic device, one or more render aspect ratios for the rendering of the one or more first images in the user interface, wherein the rendering of the one or more first images in the user interface comprises displaying the one or more first images with the one or more render aspect ratios, and storing, in a memory of the main electronic device, the one or more render aspect ratios.

Example 14. The method of example 13, wherein the storing of the one or more render aspect ratios in the memory of the main electronic device comprises writing the one or more render aspect ratios to a cache file.

Example 15. The method of example 11, wherein the first signals sensed by the one or more first sensors comprise both video signals and audio signals, receiving of the first sensor data includes receiving video data based on the video signals, and receiving of the first sensor data does not include receiving audio data based on the audio signals.

Example 16. The method of example 15, further comprising, respondent to a user selection of one of the one or more first images rendered in the user interface, receiving the audio data for the user-selected one of the one or more first images rendered in the user interface, and rendering both the audio data and the video data associated with the user-selected one of the one or more first images rendered in the user interface.

Example 17. The method of example 11, further comprising requiring authentication information for the one or more first sensors for the receiving of the first sensor data, requesting, over the network interface, the authentication information for the one or more first sensors, receiving, over the network interface, the authentication information for the one or more first sensors, and storing the authentication information for the one or more first sensors in a memory of the main electronic device.

Example 18. The method of example 11, wherein the UI comprises a user-scrollable list of live feeds.

Example 19. A non-transitory, computer-readable medium storing instructions that, when executed by one or more processors, cause the one or more processors to present a user interface on a display, the user interface associated with one or more remote sensors, the remote sensors remote from an electronic device, transmit, over a network interface, a first activation signal to one or more first sensors, the one or more first sensors comprising a first subset of the remote sensors, receive, over the network interface, first sensor data associated with first signals sensed by the one or more first sensors, render one or more first images in the user interface, the one or more first images based on the first sensor data associated with the first signals sensed by the one or more first sensors, and respondent to a lack of interaction with the one or more first images in the user interface, cease to render the one or more first images in the user interface, and transmit, over the network interface, a command to the one or more first sensors to cease transmission of the first sensor data.

Example 20. The non-transitory, computer-readable medium of example 19, wherein the instructions further cause the one or more processors to receive a user input and, respondent to receiving the user input, transmit, by the main electronic device and over the network interface, a second activation signal to one or more second sensors, the one or more second sensors comprising a second subset of the remote sensors, receive, by the main electronic device and over the network interface, second sensor data associated with second signals sensed by the one or more second sensors, and render one or more second images in the user interface, the one or more second images based on the second sensor data associated with the second signals sensed by the one or more second sensors.

Example 21. A method for simultaneously displaying multiple feeds from remote sensors, the method comprising activating a UI, the UI configured to display data from the remote sensors; sending, by a main electronic device over a network, a first activation signal to one or more first sensors, the one or more first sensors comprising a first subset of the remote sensors; receiving, by the main electronic device over the network, first sensor data based on first signals sensed by the one or more first sensors; rendering the received first sensor data to the UI; determining whether the rendering of the received first sensor data is being accessed by a user; respondent to the determination that the rendering of the first sensor data is not being accessed by the user, ceasing to render the received first sensor data to the UI; and ceasing to receive the first sensor data respondent to an idle time exceeding a threshold time, the idle time comprising a length of time since the determination that the rendering of the first sensor data is not being accessed by the user.

Example 22. The method of example 21, further comprising receiving a user input and, respondent to receiving the user input, sending, by the main electronic device over the network, a second activation signal to one or more second sensors, the one or more second sensors comprising a second subset of the remote sensors; receiving, by the main electronic device over the network, second sensor data based on second signals sensed by the one or more second sensors; and rendering the received second sensor data to the UI.

Example 23. The method of any one of examples 21 or 22, wherein the main electronic device is one of a mobile device, a display device, a hub device, or a personal computing device; and the one or more first sensors are video cameras configured to produce both video and audio signals.

Example 24. The method of example 23, further comprising setting, by the main electronic device, one or more render aspect ratios for the rendering of the received first sensor data to the UI, the one or more render aspect ratios based on one or more physical aspect ratios of the one or more first sensors; and storing, in a memory of the main electronic device, the one or more render aspect ratios.

Example 25. The method of example 24, wherein the memory of the main electronic device comprises a cache.

Example 26. The method of any one of examples 21-25, wherein the signals sensed by the one or more first sensors comprise both video signals and audio signals, the receiving of the first sensor data includes receiving video data based on the video signals, and the receiving of the first sensor data does not include receiving audio data based on the audio signals.

Example 27. The method of example 26, further comprising, respondent to a user selection of one of the one or more received first sensor data rendered to the UI, receiving the audio data for the user-selected one of the one or more received first sensor data rendered to the UI; and rendering both the audio data and the video data associated with the user-selected one of the one or more received first sensor data to the UI.

Example 28. The method of any one of examples 21-27, further comprising exchanging, over the network, authentication information for the one or more first sensors; and storing the authentication information in a memory of the main electronic device.

Example 29. The method of any one of examples 21-28, wherein the UI comprises a user-scrollable list of live feeds.

Example 30. The method of any one of examples 21-29, wherein the threshold time is set by the main electronic device and based on one or more parameters relating to at least one of the first sensors, a user interaction with the main electronic device, one or more applications currently executing on the main electronic device, and a state of the main electronic device.

Example 31. The method of any one of the 21-30, further comprising controlling the one or more first sensors by the main electronic device over the network.

Example 32. The method of any one of examples 21-31, wherein the one or more first sensors are based on a user selection of a first subset of sensors from a plurality of available sensors.

Example 33. The method of any one of examples 21-32, wherein the receiving, by the main electronic device over the network, of the first sensor data based on the first signals sensed by the one or more first sensors comprises establishing a persistent communication between the main electronic device and the one or more first sensors over the network.

Example 34. An electronic device, comprising a display element; a user input; one or more processors; and a memory storing instructions that, when executed by the one or more processors, cause the one or more processors to perform any one of the methods of examples 21 to 33.

Example 35. A non-transitory, computer-readable medium storing instructions that, when executed by one or more processors, cause the one or more processors to perform any one of the methods of examples 21 to 33.

CONCLUSION

Although aspects of rendering multiple live-streams on a UI with minimal resources have been described in language specific to features and/or methods, the subject of the appended claims is not necessarily limited to the specific features or methods described. Rather, the specific features and methods are disclosed as example implementations of the techniques for rendering multiple live-streams on a UI with minimal resources, and other equivalent features and methods are intended to be within the scope of the appended claims. Further, various different aspects are described, and it is to be appreciated that each described aspect can be implemented independently or in connection with one or more other described aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. An electronic device, the electronic device comprising:
a display;
a network interface;
one or more processors; and
a memory storing instructions that, when executed by the one or more processors, cause the one or more processors to:
    present a user interface on the display, the user interface associated with one or more remote sensors, the remote sensors remote from the electronic device;
    transmit, over the network interface, a first activation signal to one or more first sensors, the one or more first sensors comprising a first subset of the remote sensors;
    receive, over the network interface, first sensor data associated with first signals sensed by the one or more first sensors;
    render one or more first images in the user interface, the one or more first images based on the first sensor data associated with the first signals sensed by the one or more first sensors;
    determine, at a first time, a lack of interaction with the one or more first images in the user interface;
    responsive to the determination of the lack of interaction, cease to render the one or more first images in the user interface;
    determine, at a second time, that an idle time has passed since the first time, the idle time comprising a difference between the first time and the second time; and
    responsive to the idle time being greater than a threshold value, transmit, over the network interface, a command to the one or more first sensors to cease transmission of the first sensor data.

2. The electronic device of claim 1, wherein the instructions further cause the one or more processors to receive a user input and, responsive to reception of the user input:
transmit, over the network interface, a second activation signal to one or more second sensors, the one or more second sensors comprising a second subset of the remote sensors;
receive, over the network interface, second sensor data associated with second signals sensed by the one or more second sensors; and
render one or more second images in the user interface, the one or more second images based on the second sensor data associated with the second signals sensed by the one or more second sensors.

3. The electronic device of claim 1, wherein the electronic device is one of a mobile device, a display device, a hub device, or a personal computing device.

4. The electronic device of claim 1, wherein the instructions further cause the one or more processors to:
set one or more render aspect ratios for the rendering of the one or more first images in the user interface, the one or more render aspect ratios based on one or more physical aspect ratios of the one or more first sensors; and
store, in the memory, the one or more render aspect ratios.

5. The electronic device of claim 4, wherein the storage of the one or more aspect ratios in the memory comprises storage into a cache file.

6. The electronic device of claim 1, wherein:

the first signals sensed by the one or more first sensors comprise both video signals and audio signals;

the reception of the first sensor data includes reception of video data based on the video signals; and the reception of the first sensor data does not include reception of audio data based on the audio signals.

7. The electronic device of claim 6, wherein the instructions further cause the one or more processors to, responsive to a user selection of one of the one or more first images rendered in the user interface:

receive the audio data for the user-selected one of the one or more first images rendered in the user interface; and render both the audio data and the video data associated with the user-selected one of the one or more first images rendered in the user interface.

8. The electronic device of claim 1, wherein the instructions further cause the one or more processors to:

request, over the network interface, authentication information for the one or more first sensors;

receive, over the network interface, the authentication information for the one or more first sensors; and store the authentication information for the one or more first sensors in the memory.

9. The electronic device of claim 1, wherein the user interface comprises a user-scrollable list of live feeds.

10. The electronic device of claim 1, wherein the instructions further cause the one or more processors to determine the lack of interaction based on one or more parameters relating to at least one of the first sensors, a user interaction with the electronic device, one or more applications currently executing on the electronic device, or a state of the electronic device.

11. A method for simultaneously displaying multiple feeds from remote sensors, the method comprising:

presenting a user interface on a display, the user interface associated with one or more remote sensors, the remote sensors remote from an electronic device;

transmitting, by a main electronic device and over a network interface, a first activation signal to one or more first sensors, the one or more first sensors comprising a first subset of the remote sensors;

receiving, by the main electronic device and over the network interface, first sensor data associated with first signals sensed by the one or more first sensors;

rendering one or more first images in the user interface, the one or more first images based on the first sensor data associated with the first signals sensed by the one or more first sensors;

determine, at a first time, a lack of interaction with the one or more first images in the user interface;

responsive to the determination of the lack of interaction, ceasing to render the one or more first images in the user interface;

determining, at a second time, that an idle time has passed since the first time, the idle time comprising a difference between the first time and the second time; and responsive to the idle time being greater than a threshold value, transmitting, by the main electronic device and over the network interface, a command to the one or more first sensors to cease transmission of the first sensor data.

12. The method of claim 11, further comprising receiving a user input and, responsive to receiving the user input:

transmitting, by the main electronic device and over the network interface, a second activation signal to one or more second sensors, the one or more second sensors comprising a second subset of the remote sensors;

receiving, by the main electronic device and over the network interface, second sensor data associated with second signals sensed by the one or more second sensors; and rendering one or more second images in the user interface, the one or more second images based on the second sensor data associated with the second signals sensed by the one or more second sensors.

13. The method of claim 11, further comprising:

setting, by the main electronic device, one or more render aspect ratios for the rendering of the one or more first images in the user interface, wherein the rendering of the one or more first images in the user interface comprises displaying the one or more first images with the one or more render aspect ratios; and storing, in a memory of the main electronic device, the one or more render aspect ratios.

14. The method of claim 13, wherein the storing of the one or more render aspect ratios in the memory of the main electronic device comprises writing the one or more render aspect ratios to a cache file.

15. The method of claim 11, wherein:

the first signals sensed by the one or more first sensors comprise both video signals and audio signals;

the reception of the first sensor data includes receiving video data based on the video signals; and the reception of the first sensor data does not include receiving audio data based on the audio signals.

16. The method of claim 15, further comprising, responsive to a user selection of one of the one or more first images rendered in the user interface:

receiving the audio data for the user-selected one of the one or more first images rendered in the user interface; and rendering both the audio data and the video data associated with the user-selected one of the one or more first images rendered in the user interface.

17. The method of claim 11, further comprising:

requiring authentication information for the one or more first sensors for the receiving of the first sensor data;

requesting, over the network interface, the authentication information for the one or more first sensors;

receiving, over the network interface, the authentication information for the one or more first sensors; and storing the authentication information for the one or more first sensors in a memory of the main electronic device.

18. The method of claim 11, wherein the user interface comprises a user-scrollable list of live feeds.

19. A non-transitory, computer-readable medium storing instructions that, when executed by one or more processors, cause the one or more processors to:

present a user interface on a display, the user interface associated with one or more remote sensors, the remote sensors remote from an electronic device;

transmit, over a network interface, a first activation signal to one or more first sensors, the one or more first sensors comprising a first subset of the remote sensors;

receive, over the network interface, first sensor data associated with first signals sensed by the one or more first sensors;

render one or more first images in the user interface, the one or more first images based on the first sensor data associated with the first signals sensed by the one or more first sensors;

determine, at a first time, a lack of interaction with the one or more first images in the user interface;

responsive to the determination of the lack of interaction, cease to render the one or more first images in the user interface; 5 determine, at a second time, that an idle time has passed since the first time, the idle time comprising a difference between the first time and the second time; and responsive to the idle time being greater than a threshold value, transmit, over the network interface, a command 10 to the one or more first sensors to cease transmission of the first sensor data.

20. The non-transitory, computer-readable medium of claim 19, wherein the instructions further cause the one or more processors to receive a user input and, responsive to 15 receiving the user input:

transmit, by the main electronic device and over the network interface, a second activation signal to one or more second sensors, the one or more second sensors comprising a second subset of the remote sensors; 20 receive, by the main electronic device and over the network interface, second sensor data associated with second signals sensed by the one or more second sensors; and render one or more second images in the user interface, 25 the one or more second images based on the second sensor data associated with the second signals sensed by the one or more second sensors.

* * * * *